United States Patent
Mosier et al.

(10) Patent No.: US 11,112,052 B2
(45) Date of Patent: Sep. 7, 2021

(54) WELD REPAIR SYSTEMS AND METHODS FOR USE IN A NUCLEAR REACTOR JET PUMP

(71) Applicant: GE-Hitachi Nuclear Energy Americas LLC, Wilmington, NC (US)

(72) Inventors: Sean T. Mosier, Wilmington, NC (US); Bret E. Nelson, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 956 days.

(21) Appl. No.: 15/473,903

(22) Filed: Mar. 30, 2017

(65) Prior Publication Data
US 2018/0283593 A1   Oct. 4, 2018

(51) Int. Cl.
| | |
|---|---|
| *F16L 55/18* | (2006.01) |
| *F04F 5/44* | (2006.01) |
| *B23P 6/00* | (2006.01) |
| *G21C 15/25* | (2006.01) |
| *G21C 13/032* | (2006.01) |
| *F04F 5/10* | (2006.01) |
| *F16L 43/00* | (2006.01) |
| *F16L 13/02* | (2006.01) |
| *F16L 55/168* | (2006.01) |
| *F16L 43/02* | (2006.01) |

(52) U.S. Cl.
CPC ............ *F16L 55/18* (2013.01); *B23P 6/00* (2013.01); *F04F 5/10* (2013.01); *F04F 5/44* (2013.01); *G21C 13/032* (2013.01); *G21C 15/25* (2013.01); *F16L 13/02* (2013.01); *F16L 43/001* (2013.01); *F16L 43/02* (2013.01); *F16L 55/168* (2013.01); *Y02E 30/30* (2013.01)

(58) Field of Classification Search
CPC ....................................................... F16L 55/18
See application file for complete search history.

(56) References Cited

U.S. PATENT DOCUMENTS

| | | | |
|---|---|---|---|
| 6,108,391 A | 8/2000 | Deaver et al. | |
| 6,375,230 B1 | 4/2002 | Jensen et al. | |
| 8,718,222 B2 * | 5/2014 | Abura | G21C 15/25 376/372 |
| 2008/0107227 A1 * | 5/2008 | Koepke | B23K 37/0435 376/302 |

FOREIGN PATENT DOCUMENTS

GB          400079 A  * 10/1933   ............. F16L 13/04

* cited by examiner

*Primary Examiner* — Moshe Wilensky
*Assistant Examiner* — Kyle A Cook
(74) *Attorney, Agent, or Firm* — Ryan Alley IP

(57) ABSTRACT

Systems repair jet pump elbow joining structures like RS1 and RS2 welds. Systems include a base having legs that secure to ends of the elbow in different directions, and a drive plate that joins to flow conduits where they meet the elbow. The drive plate and base may then be pushed together, resulting in compression or joining of the elbow and flow conduit. Multiple drive plates may be used with a single base to compress multiple flow conduits to the base. The base and the drive plates can be driven together with a driving bolt extending through the base and driving plate. To provide a better fit, grooves can be created in the flow conduits through machining from the installed base. The drive plate may be seated into the groove to achieve a desired orientation with less slippage. Example embodiments and methods do not require welding or a welding base.

20 Claims, 6 Drawing Sheets

WELD REPAIR SYSTEMS AND METHODS FOR USE IN A NUCLEAR REACTOR JET PUMP

BACKGROUND

FIG. 1 is a perspective view of a related art boiling water reactor (BWR) jet pump assembly 8. The major components of the jet pump assembly 8 include a riser pipe 5 and two inlet mixers 4 that insert into respective diffusers 2. Jet pump restrainer brackets 3 are used to stabilize movement of the inlet mixers 4 and reduce movement of and leakage at slip joint 1 that exists at the interface between inlet mixers 4 and diffusers 2, to minimize leakage or damage around slip joint 1. Riser pipe 5 provides feedwater as a primary coolant source for the reactor, which flows up through riser pipe 5 and then typically divides and flows back down into plural inlet mixers 4 for injection into the reactor with momentum from the downward flow.

Riser pipe 5 is conventionally positioned at a periphery of the reactor, such as in a downcomer annulus or other condensed water inflow; for example, riser pipe 5 may be bracketed to an inner wall 10 of the reactor vessel. To achieve the desired upward/downward flow that uses gravity to impart flow momentum, riser 5 includes elbow 6 shortly after passing through wall 10 of the reactor pressure vessel. Elbow 6 is typically welded to riser 5 at top as well as an inlet thermal sleeve (not shown) extending inside vessel wall 10.

SUMMARY

Example embodiments include systems for repairing jet pump elbows having failing welds or other joints that join the elbow to jet pump flow paths, such as a riser pipe and a feedwater inlet with a thermal jacket that join to perpendicular ends of the elbow. Of particular interest for failure are RS1 and RS2 welds, which are typically circular or similar welds at the perimeter of where the elbow ends join to flow conduit ends. An example embodiment includes a base with one leg joining to one side of the elbow and another leg joining to another side of the elbow. Where the base joins to the elbow, it may be secured to the elbow in a direction that is the same as compressive force in the weld at the join point, so as to provide force balance. For example, in a 90-degree elbow with ends and flow paths that extend perpendicularly, the base may secure around the elbow at complimentary 90-degree positions. Example embodiments further include a drive plate that joins to an end of the flow path near where it meets the elbow, at the other side from where the base joins to the elbow end. The drive plate is secured to the flow path such that when the drive plate and base are pushed together, the flow path and elbow are compressed together. Multiple drive plates may be used, such as one at either end of the elbow, and bias against the same base in different directions along the flow conduits. The base and drive plate(s) may be statically secured with the elbow and joining conduits, such as through locking tongues and grooves, to ensure that all forces imparted to and between the base and drive plate(s) are transferred to the underlying elbow and flow paths. For example, the base may clamp around each end of the elbow with clampable legs that substantially surround each end, and the drive plate(s) may similarly clamp around the flow conduit ends with sections that substantially surround each flow conduit. The base and the drive plate(s) can be driven together to compress and relieve tension in the weld or other joining structure between the two. For example, a driving bolt extending through both the base and driving plate may be tensioned to drive the base and driving plate together, compressing any weld therebetween.

Example methods include repairing jet pump elbow joining structures, such as the RS1 and/or RS2 welds. Example methods may statically join a base to two opposite ends of the elbow, statically join a drive plate to an end of riser pipe or thermal sleeve or the like extending into the elbow, and push the drive plate and the base together to compress the two together, replacing or relieving stress in any weld or other joining structure between the two. The base may join to the elbow opposite the draw plate, transferring all the pushing force to the elbow. Example methods may create grooves in the riser or thermal sleeve, such as electric discharge machine grooves on either side of these conduits into which tongues of the drive plate can lock. Any machining can be performed from the installed base. Example methods may join the base and the drive plates to the underlying elbow and flow conduits through clamping that partially or completely surrounds the elbow ends and flow conduit ends about the weld or other joining structure to be repaired or relieved. Example embodiments and methods do not require welding or a welding base, and thus may be useable in nuclear reactor jet pumps having insufficient spacing about their elbows for welding tooling.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
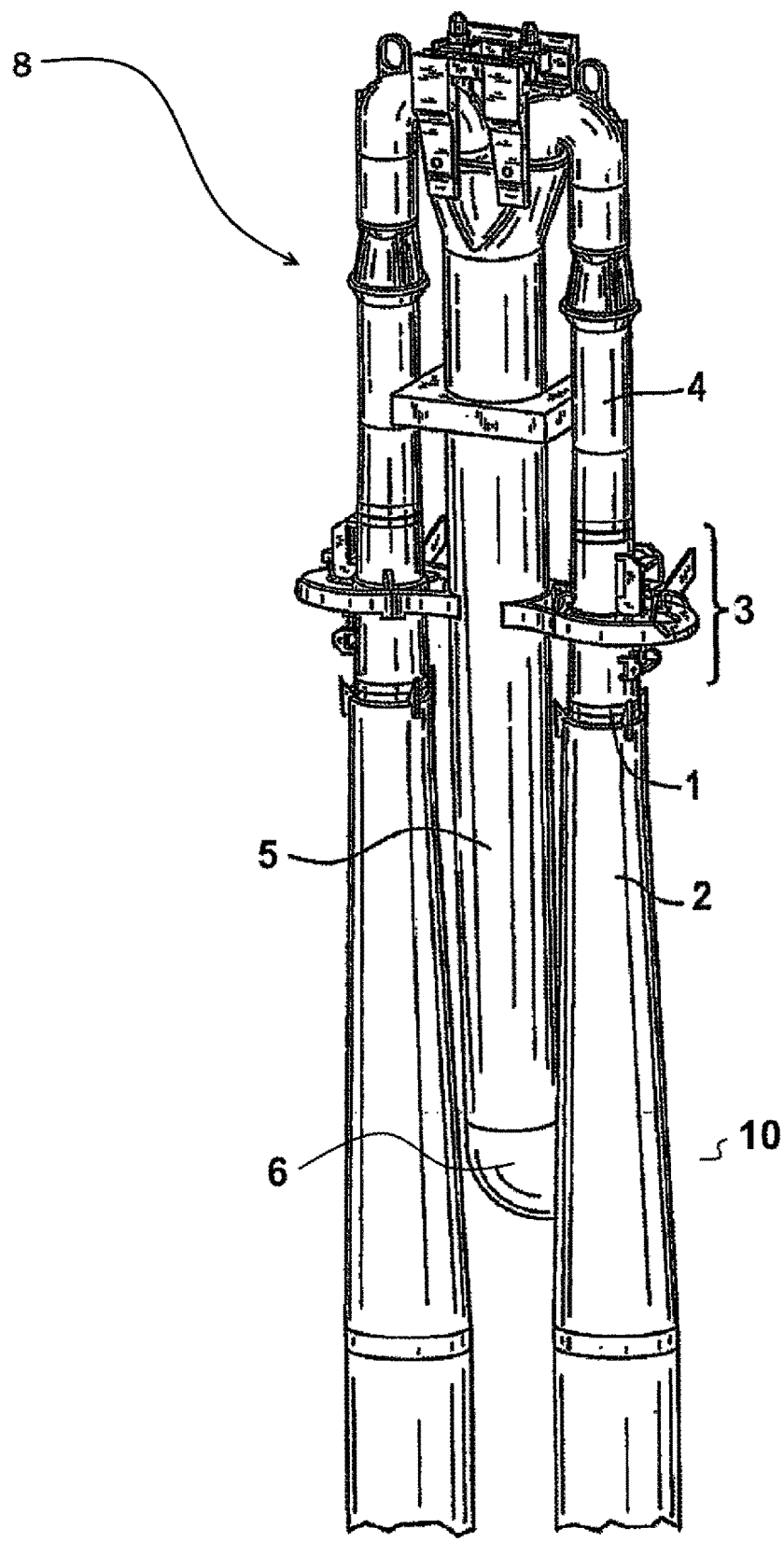
FIG. 1 is an illustration of a related art jet pump assembly for use in a nuclear power plant.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

Figure 2:
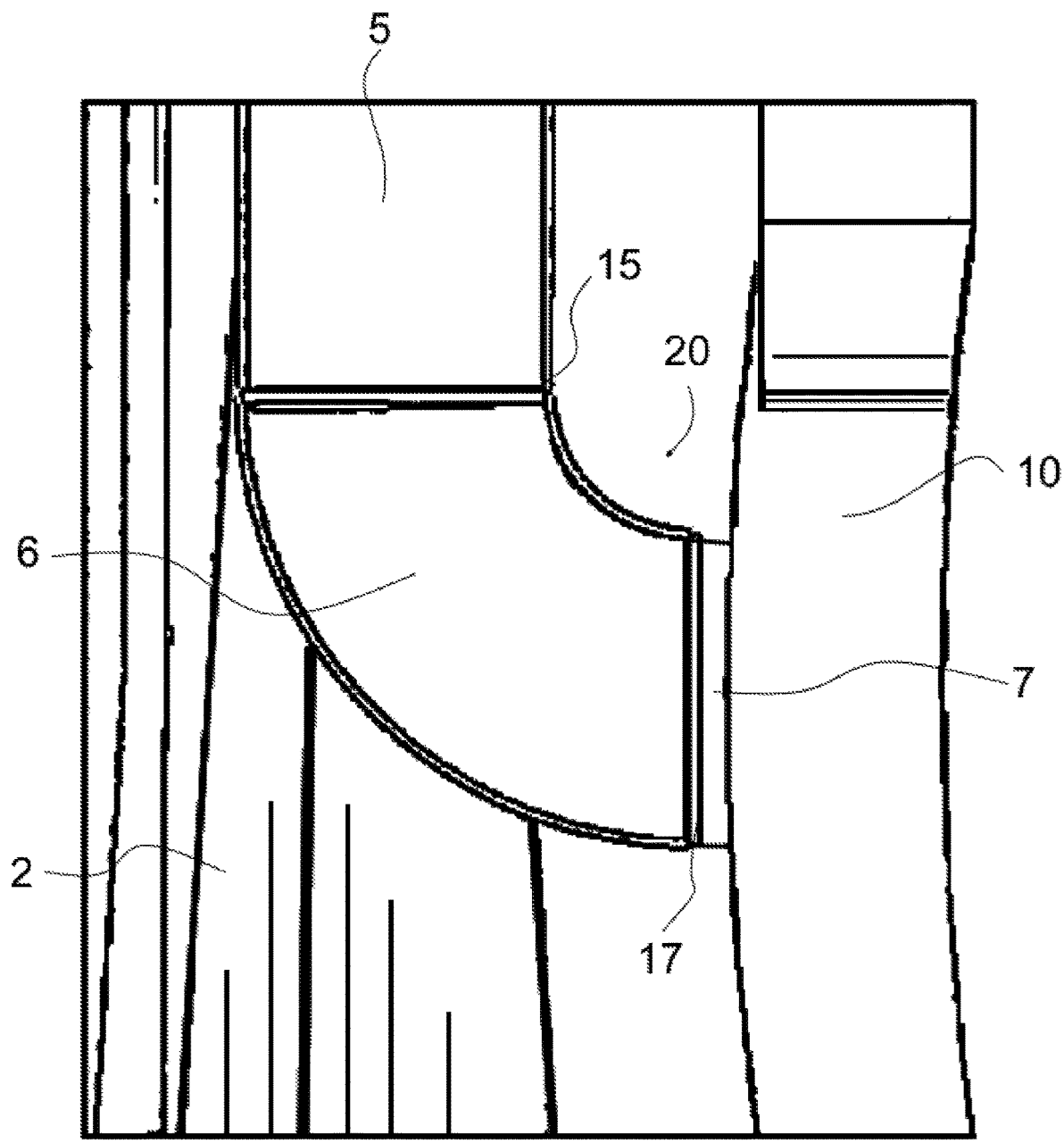
FIG. 2 is an illustration of a riser elbow useable in example embodiments and methods.

The Inventors have newly recognized that riser pipe elbow welds in nuclear reactors may require repair in restrictive spaces. As shown in FIG. 2, thermal sleeve 7 may pass through wall 10 of a reactor pressure vessel to elbow 6, which joins vertically with riser pipe 5. Weld 17, at the interface of elbow 6 and thermal sleeve 17, called an RS1 weld, may require repair or functional replacement after several years of operation. Similarly, weld 15, at the interface of riser 5 and elbow 6, called an RS2 weld, may require repair or functional replacement after several years of operation. However, the Inventors have discovered that elbow 6 is rarely an even, 90-degree toroid section, but often of variable shape and sizing from one reactor to another, and even one jet pump to another. Welds 17 and 15 are thus often non-standard, making their replacement and repair difficult. Moreover, the Inventors have newly discovered that space 20 between elbow 6 and wall 10 is often insufficient for a conventional baseplate to be installed to support weld repair tooling and activity at welds 15 and 17. That is, elbow 6 in FIG. 2 may be too close to wall 10 such that space 20 does not allow welding repairs to welds 15 or 17 or elbow 6 where it joins with riser 5 or thermal sleeve 7. Example embodiments described below uniquely enable solutions to these and other problems discovered by the Inventors.

The present invention is systems for repairing welds in limited spaces and methods for repairing such welds. In contrast to the present invention, the few example embodiments and example methods discussed below illustrate just a subset of the variety of different configurations that can be used as and/or in connection with the present invention.

Figure 3:
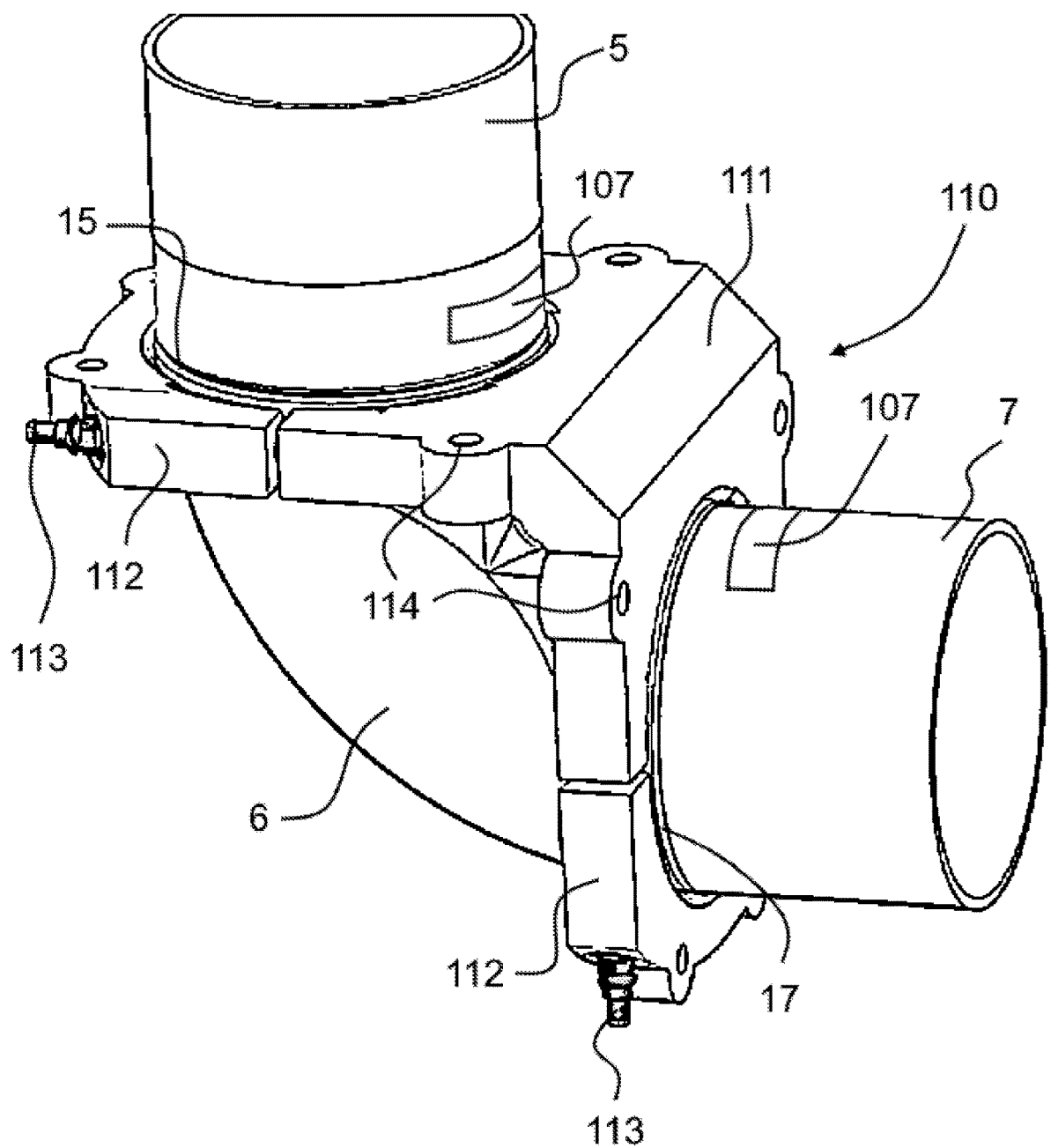
FIG. 3 is an illustration of an example embodiment L-base installed at a riser elbow.

FIG. 3 is an illustration of an example embodiment L-base 110 mounted on elbow 6. Elbow 6 may be joined to example embodiment machined thermal sleeve 7 and example embodiment machined riser pipe 5, which may be elbow 6, thermal sleeve 7, and riser pipe 5 from FIG. 2. As seen in FIG. 3, L-base 110 is shaped to extend to both ends and sides of elbow 6, with one leg extending vertically and another horizontally at approximately 90-degrees. In this way a corner of L-base 110 may be positioned in a concavity of elbow 6, while legs of L-base 110 extend just below and beside welds 15 and 17, on elbow 6. Although L-base 110 is shown at an approximately 90-degree bend about a substantially 90-degree elbow 6, it is understood that other elbow angles and/or shapes can be joined by L-base 110 with proper shaping.

Example embodiment L-base 110 secures to elbow 6 so as to statically move with, and convey force to, elbow 6. For example, as shown in FIG. 3, L-base 110 may include a clamp center 111 to which clamp wings 112 removably secure to clamp to elbow 6. Clamp center 111 may include two surfaces shaped to partially match a perimeter of elbow 6 adjacent to welds 15 and/or 17, such as semi-circles, ellipse segments, etc. Similarly, clamp wings 112 may match the remaining perimeter of elbow 6 at the same location, such that clamp wing 112 and clamp center 111 may completely or partially surround an end of elbow 6. Of course, if elbow 6 is another shape or orientation, contact surfaces of clamp center 111 and clamp arms 112 may be shaped to match a perimeter of elbow 6 having a different shape; likewise clamp base 111 may be a shape other than a 90-degree "L" so that legs of L-base 110 and clamp wings 112 extend at other degrees to ends of other shapes, and.

Clamp wings 112 may removably join to clamp center 111, such as through draw bolts 113 that run a length of clamp wing 112 and into clamp base 111 for example. By aligning and tightening draw bolts 113 of clamp wings 112 with either leg of clamp center 111, each clamp wing 112 may enclose and/or be biased against elbow 6, with corresponding contact surfaces of clamp center 111 oppositely biasing the same end of elbow 6. Clamp wings 112 and clamp center 111 may have sealants or gaskets on contact surfaces shaped to bias against and/or surround an end of elbow 6 with flexible clamping action and/or to limit deformation of elbow 6 upon forceful contact with L-base 110. With clamp wings 112 secured to legs of clamp center 111 and elbow 6, L-base 110 may be relatively static with elbow 6 in each dimension and about every axis and/or transfer all external force and torque to elbow 6, except for any allowances or elastic pieces between elbow 6 and contact surfaces of L-base 110.

As shown in FIG. 3, thermal sleeve 7 and/or riser 5 may include locking groove 107 positioned just beyond elbow 6 and welds 17 and/or 15, so as to be just beyond L-base 110 installed on elbow 6. Grooves 107 may be on both sides of riser 5 and/or thermal sleeve 7 in any number and/or at positions where a locking tongue is expected to seat into groove 107. Locking grooves 107 are not conventionally present in a riser or thermal sleeve, and thus example embodiment riser 5 and/or example embodiment 7 may replace conventional structures or be modified from conventional structures to have groove(s) 107. For example, operators or tooling may machine groove 107 into opposite sides of riser 5 and/or thermal sleeve 7 through electrical discharge machining or another method of forming grooves. L-base 110 installed at elbow 6 may provide a base for any electrical discharge machining once installed, given its proximity to grooves 107.

Figure 4:
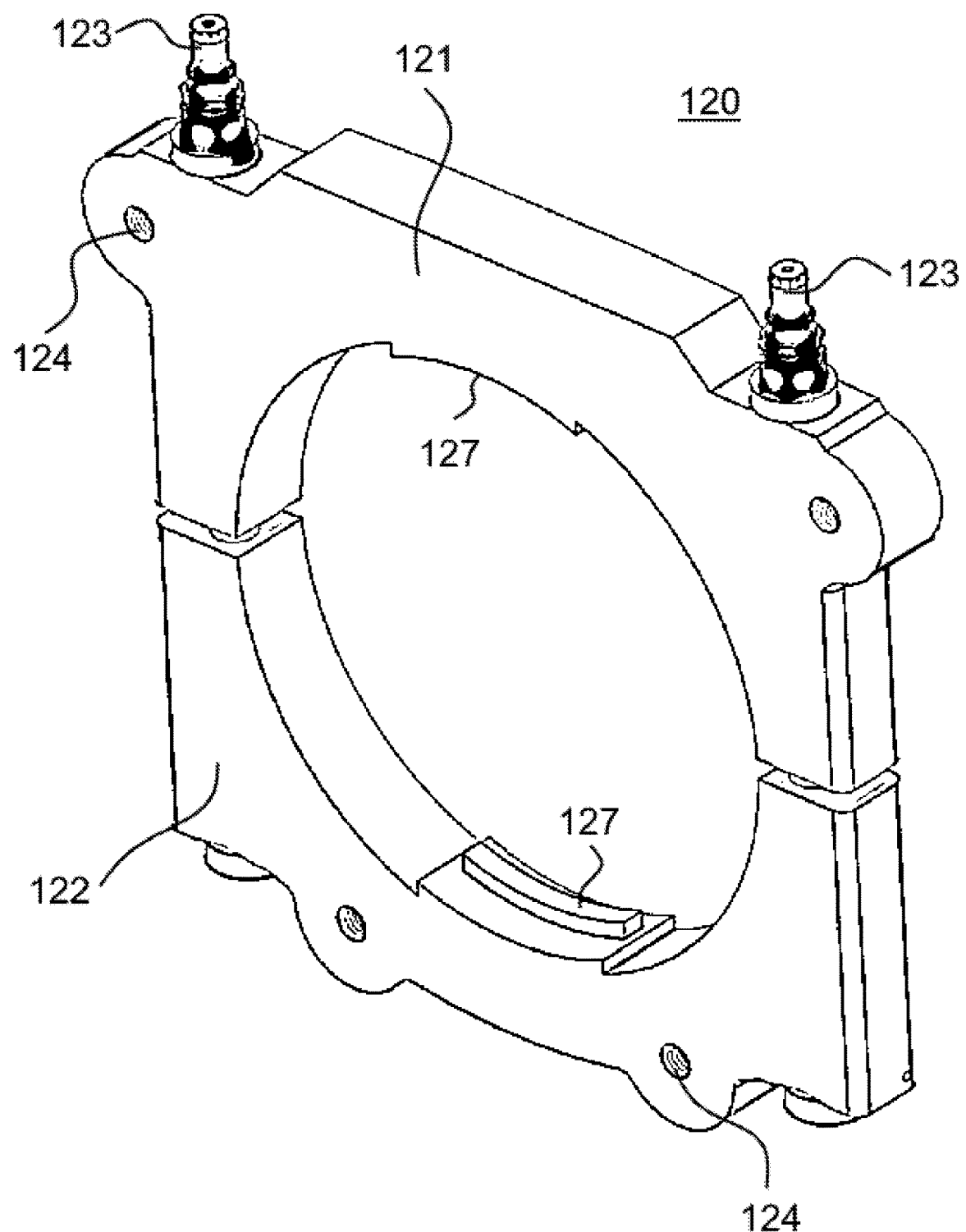
FIG. 4 is an illustration of an example embodiment draw plate.

FIG. 4 is an illustration of an example embodiment draw plate 120 useable with example methods and example embodiment riser repair systems. As shown in FIG. 4, example embodiment draw plate 120 includes first section 121 and second section 122 that define a contact surface, such as semi-circles, ellipse segments, etc. for either riser 5 or thermal sleeve 7 (FIGS. 2 & 3). Although the contact surface in FIG. 4 is shown as semi-circular for both first section 121 and second section 122, it is understood that these shapes may be varied to match other surfaces. First section 121 and second section 122 may together completely or partially surround a perimeter of an object, such as riser 5 and/or thermal sleeve 7. First section 121 and second section 121 may include locking tongue 127 shaped to seat into locking groove 107 (FIG. 3) on riser 5 and/or thermal sleeve 7.

First section 121 removably joins to second section 122. For example, draw bolts 123 may extend through first section 121 and into a threaded hole and/or to a nut on another end of second section 122 to draw the sections together. In a similar way to L-base 110 (FIG. 3), first section 121 and second section 122 can clamp around an object, such as a riser or thermal sleeve, to desired tension with easily installation and removal. Clamping surfaces, elastics, gaskets, etc. may be placed on and/or line a perimeter of first or second section 121/122 to facilitate such clamping, ensure a desired seal, create a static relationship among sections 121 and 122 and parts clamped thereby, and/or avoid deformation of such parts.

Example embodiment draw plate 120 matches with parts of L-base 110 (FIG. 3). For example, where L-base 110 joins to elbow 6 just next to weld 15 and/or weld 17, draw plate 120 may congruently fit just on the other side of weld 15 and/or 17 on riser 5 and/or thermal sleeve 7. And, for example, draw plate 120 may define one or more drive bosses 124 that match positions of receiver bosses 114 (FIG. 3) in L-base 110 when all components of L-base and draw plate 120 are joined together.

Figure 5:
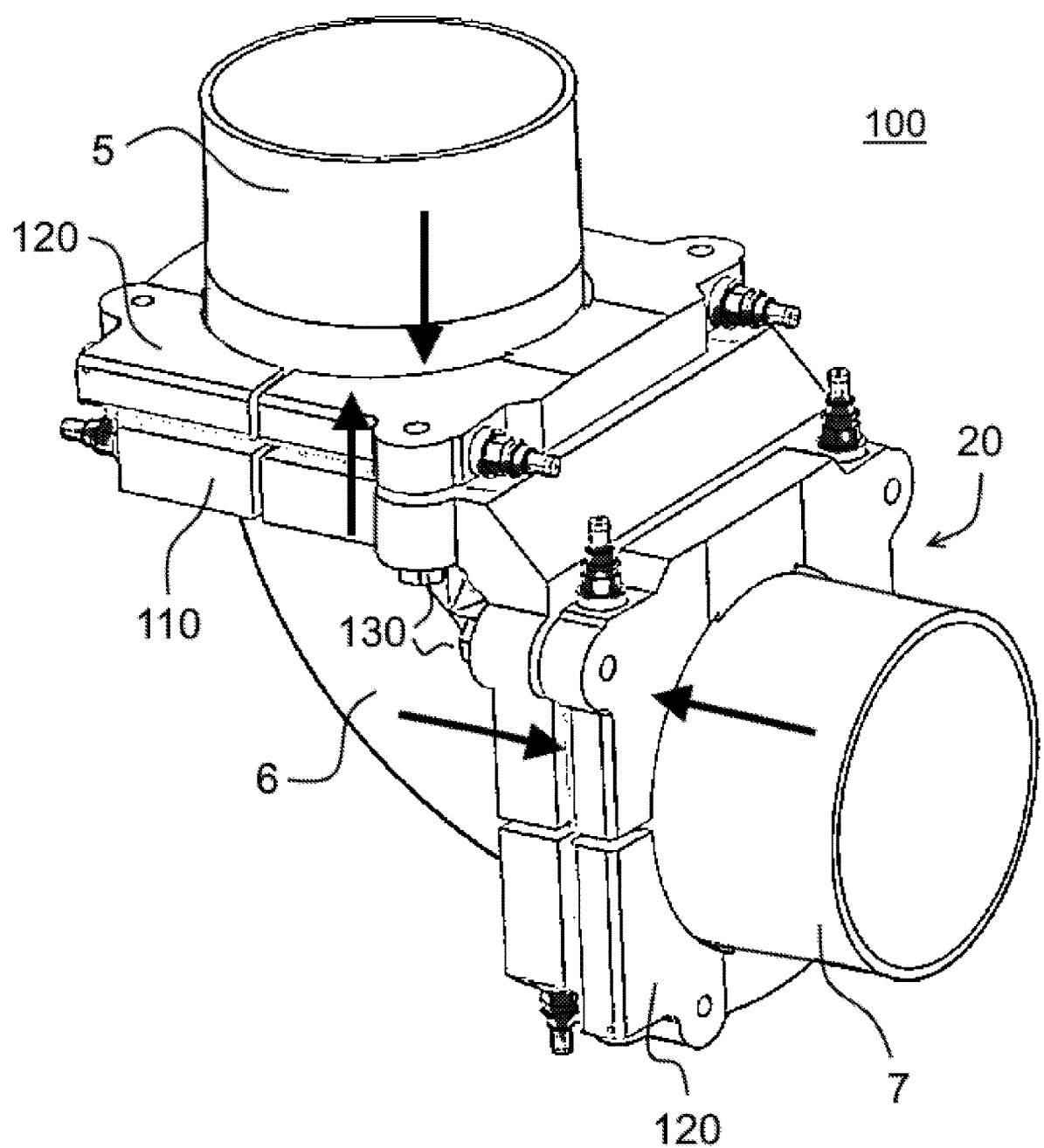
FIG. 5 is an illustration of an example embodiment weld repair system.

FIG. 5 is an illustration of an example embodiment weld repair system that uses L-base 110 and at least one drive plate 120 on riser 5, elbow 6, and riser 7, such as those features in a jet pump assembly from FIGS. 2 and 3 having limited clearance space 20 and/or grooves 107. As seen in FIG. 5, drive plate 120 may be clamped around thermal sleeve 7, with locking tongues 127 (FIG. 4) fitting into locking grooves 107 (FIG. 3) on opposite sides of thermal sleeve 7. Drive plate 120 may be installed in an opposite orientation from L-base 110, such that drive bolts or other removable connectors are accessed on opposite sides as shown in FIG. 5, to prevent congestion or confusion as to element being manipulated or clamped. Tongues and grooves in thermal sleeve 7 and drive plate 120 may be in pairs offset at different lengths along thermal sleeve 7 to force such opposite orientation of drive plate 120. In the same manner as drive plate may be clamped around thermal sleeve 7, drive plate 120 may be clamped to riser pipe 5, potentially in combination with an additional drive plate 120 on thermal sleeve 7.

Secured to riser 5 and/or thermal sleeve 7, drive plate 120 and L-base 110, secured to elbow 6, are biased toward one another. For example, driving bolt 130 may be passed through aligned drive boss 124 and receiver boss 114 in drive plate 120 and L-base 110, potentially at multiple positions. Rotation or other tightening of driving bolts 130 may draw drive plate 120 and L-base 110 together to desired positions and/or levels of static biasing between joined structures. Other joining and biasing structures may be used of course to drive and compress drive plate 120 to L-base 110.

The secured connections among L-base 110 and elbow 6, drive plate 120 and thermal sleeve 7, and/or drive plate 120 and riser 5 push elbow 6 together with riser 5 and/or thermal sleeve 7 as shown by directional arrows in FIG. 5. Because L-base 110 may be secured laterally and vertically to elbow 6 through legs extending in those directions, biasing from drive plate 120 ultimately results in opposite force against surfaces of elbow 6, which removes tension from welds and/or holds riser 5 or thermal sleeve 7 to elbow 6, replacing welds. The compression shown by the lower horizontal arrows in thermal sleeve 7 and elbow 6 relieves stress on weld 17 (FIG. 3). The compression shown by the upper vertical arrows in riser 5 and elbow 6 relieves stress on weld 15 (FIG. 3). The compression may hold components to elbow 6 regardless of weld functioning, reducing or eliminating a need for re-welding in a limited space 20 where a full welding platform and tooling cannot reach. Because L-base 110 and one or more driving plates 120 may all be assembled and fit within space 20 that is immediately adjacent to a reactor wall without significantly more room that that occupied by elbow 6, the difficulty of welding in limited space 20 is avoided.

Example embodiment repair system 100 may be fabricated of any materials that are compatible with an operating nuclear reactor environment, including materials that maintain their physical characteristics when exposed to high-temperature fluids and radiation. For example, metals such as stainless steels and iron alloys, nickel alloys, zirconium alloys, etc. are useable in example embodiment clamp 100. Directly contacting components may be fabricated of differing materials to prevent fouling or metal-on-metal reactions.

Figure 6:
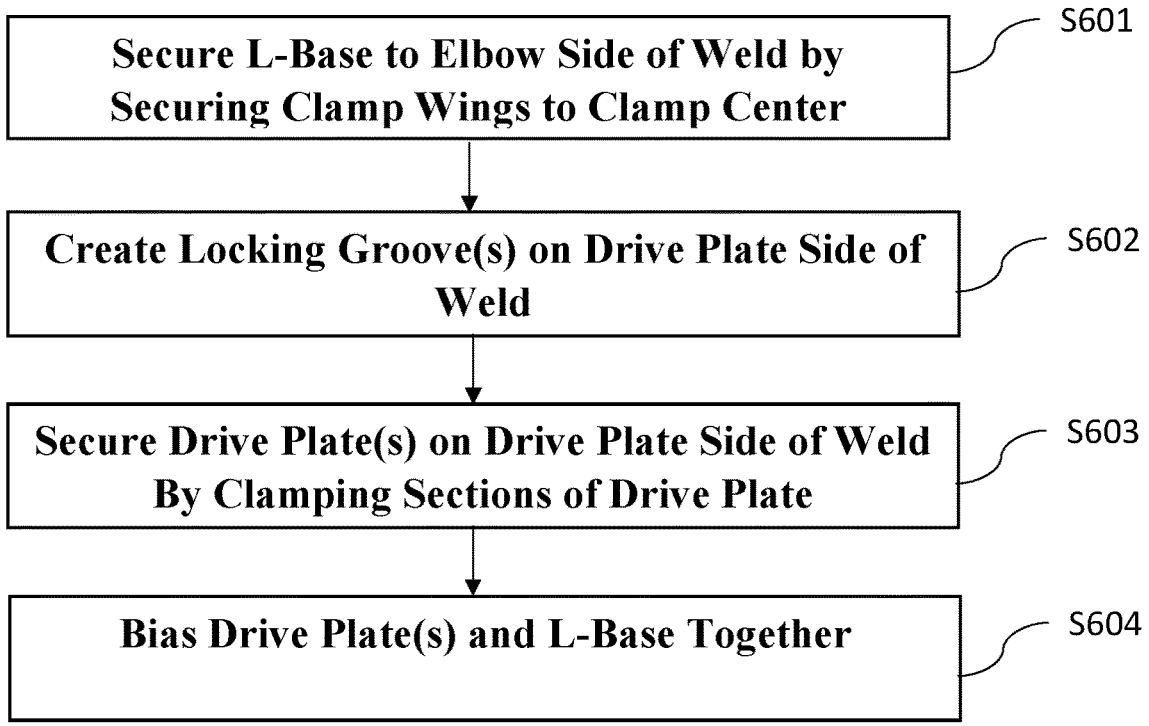
FIG. 6 is a flowchart of an example method of repairing a weld.

FIG. 6 is a flow chart of an example method of performing a weld repair on a nuclear reactor jet pump, potentially using example embodiment weld repair system 100 referenced in FIG. 5. As shown in FIG. 6, in S601 a base is secured to elbow 6 just inside of the weld to be repaired. The base is secured in S601 by joining or securing onto an opposite surface of elbow 6. For example, L-base 110 may be secured to one side of a weld(s) of interest, such as welds 15 and/or 17 (FIG. 3) on either end of elbow 6, by tightening clamp wings 112 to clamp center 111 around elbow 6.

In S602, locking grooves may be formed on the other side of the weld(s). The base secured in S602 may be used as a machining platform, which may be considerably smaller than a platform required for welding, for forming the grooves; alternatively, grooves may be formed before and/or independently of base installation in S601. For example, locking grooves 107 (FIG. 3) may be machined into a riser 5 and/or thermal sleeve 107 in S601.

In S603, a drive plate is secured opposite across from the base. The drive plate matches with the base so that the two can be drawn together while imparting compression force to the weld. For example, driving plate 120 may be clamped onto thermal sleeve 7 and/or riser pipe 5 in S603, potentially through one or more locking tongue and grooves previously machined into thermal sleeve 7 and/or riser pipe 5.

In S604, the drive plate and base are biased together, such as through screws, springs, wedges, etc. The biasing compresses the weld through the base secured to one side of the weld and the drive plate secured to another side of the weld. For example, drive plate 120 may be compressed against L-base 110 through tightening of driving bolts 130 extending through plate 120 and base 130. In this way thermal sleeve 7 and/or riser 5 may be compressed to elbow 6, relieving welds 17 and/or 15 (FIG. 3).

Example embodiments and methods thus being described, it will be appreciated by one skilled in the art that example embodiments may be varied and substituted through routine experimentation while still falling within the scope of the following claims. For example, a generally toroidal-section elbow has been shown in connection with an example; however, other configurations and shapes of elbows, and piping connected thereto, are compatible with example embodiments and methods simply through proper dimensioning and placement—and fall within the scope of the claims. Such variations are not to be regarded as departure from the scope of these claims.

What is claimed is:

1. A system for repairing a jet pump elbow having at least one of, a first weld connecting the elbow to a first conduit extending in a first direction from the elbow, and a second weld connecting the elbow to a second conduit extending in a second direction from the elbow, the system comprising:
   a single-piece base having a first leg shaped to secure in the first direction around the elbow at the first weld and a second leg shaped to secure in the second direction around the elbow at the second weld; and
   a drive plate shaped to secure around at least one of the first conduit at the first weld and the second conduit at the second weld, wherein the drive plate and the base are configured to bias against each other so as to compress the at least one of the first conduit and the second conduit into the elbow.

2. The system of claim 1, wherein the first conduit is a thermal sleeve configured to provide feedwater, and wherein the second conduit is a riser configured to flow the feedwater vertically against gravity in the jet pump.

3. The system of claim 1, wherein the at least one first conduit and second conduit includes a locking groove at the first or the second weld, and wherein the drive plate includes a locking tongue shaped to seat into the locking groove to prevent relative movement of the drive plate and the at least one first and second conduit.

4. The system of claim 1, wherein the drive plate includes two sections that are removably joinable, and wherein the two sections joined define a perimeter matching a perimeter of one of the first and the second conduits.

5. The system of claim 1, wherein the base and the drive plate define a plurality of bosses passing continuously through the base and the drive plate when joined at opposite sides of the first weld, the system further comprising:
   a plurality of driving bolts, each shaped to pass through one of the bosses, wherein the driving bolts are configured to bias the drive plate and the base toward each other.

6. The system of claim 1, further comprising:
   a first clamp wing and a second clamp wing, wherein the first clamp wing and the second clamp wing are removably joinable to the base.

7. The system of claim 6, further comprising:
   a plurality of draw bolts passing through the base and at least one of the first clamp wing and the second clamp wing, wherein the draw bolts are configured to drive the first clamp wing and the second clamp wing to the base when tightened.

8. The system of claim 1, wherein the drive plate is shaped to secure around the first conduit at the first weld, the system further comprising:
   an additional drive plate shaped to secure around the second conduit at the second weld, wherein the additional drive plate is configured to bias against the base so as to compress the second conduit into the elbow.

9. The system of claim 8, wherein the first direction and the second direction are substantially 90 degrees apart.

10. The system of claim 9, wherein the drive plate is configured to secure around the first conduit in the second direction and compress the first conduit in the first direction into the elbow, and wherein the additional drive plate is configured to secure around the second conduit in the first direction and compress the second conduit in the second direction into the elbow.

11. A method of repairing one or more welds on a jet pump elbow, the method comprising:
    securing a base having a first leg and a second leg to the elbow such that the first leg passes around a first portion of the elbow extending in a first direction and the second leg of the elbow passes around a second portion of the elbow extending in a second direction;
    securing a first drive plate to a first conduit extending in the first direction from the first portion of the elbow; and
    biasing the first drive plate and the first leg of the base together in the first direction so as to compress the second leg of the base into the second portion of the elbow in the first direction.

12. The method of claim 11, wherein the first conduit is at least one of a riser flowing vertically upward against gravity from the elbow and a thermal sleeve flowing horizontally into the elbow, and wherein the end of the first conduit includes a weld joining the first conduit to the elbow.

13. The method of claim 11, wherein the securing the base includes clamping a first clamp wing to a clamp center around the elbow at the first portion of the elbow and clamping a second clamp wing to the clamp center around the elbow at the second portion of the elbow.

14. The method of claim 11, wherein the securing the first drive plate includes clamping a first section and a second section of the first drive plate around the conduit.

15. The method of claim 11, wherein the biasing the first drive plate and the base together includes tensioning a plurality of driving bolts extending through the first drive plate and the base.

16. The method of claim 11, wherein the method does not include welding or installing a welding base.

17. The method of claim 11, further comprising:
    securing a second drive plate to a second conduit extending in the second direction from the elbow; and
    biasing the second drive plate and the second leg of the base together in the second direction so as to compress the first leg of the base into the first portion of the elbow in the second direction.

18. The method of claim 17, wherein the first direction and the second direction are substantially perpendicular to each other.

19. The method of claim 11, further comprising:
    forming a locking groove in the first conduit where the first drive plate secures to the first conduit, wherein the securing the first drive plate includes inserting a locking tongue of the first drive plate into the locking groove.

20. The method of claim 19, wherein the forming the locking groove uses electrical discharge machining the groove into the first conduit, and wherein the electrical discharge machining includes using the base as a machining base.

\* \* \* \* \*